July 9, 1929.    G. LIDSEEN    1,720,367
MEAT PRESS
Filed June 1, 1926
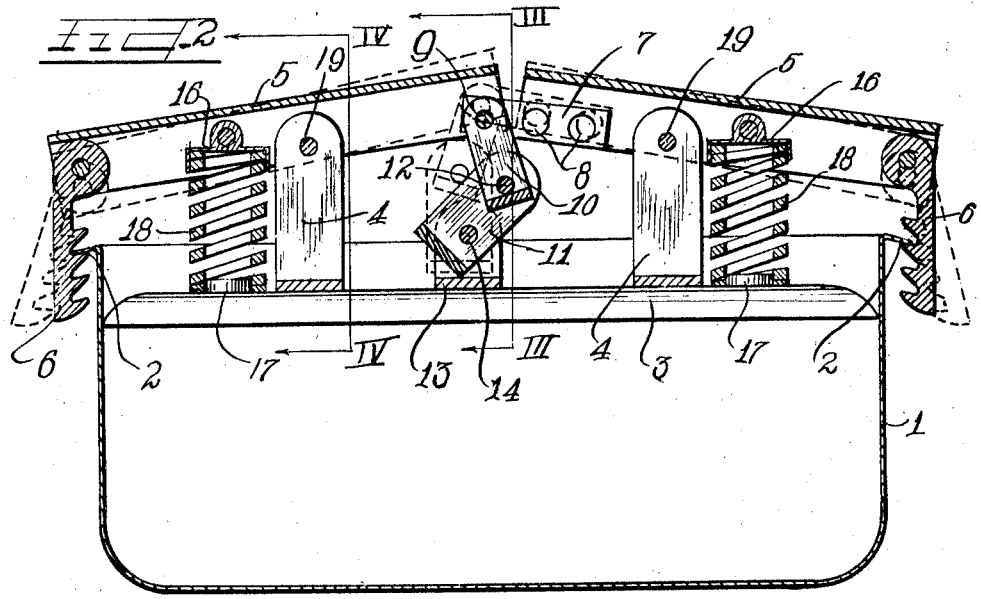
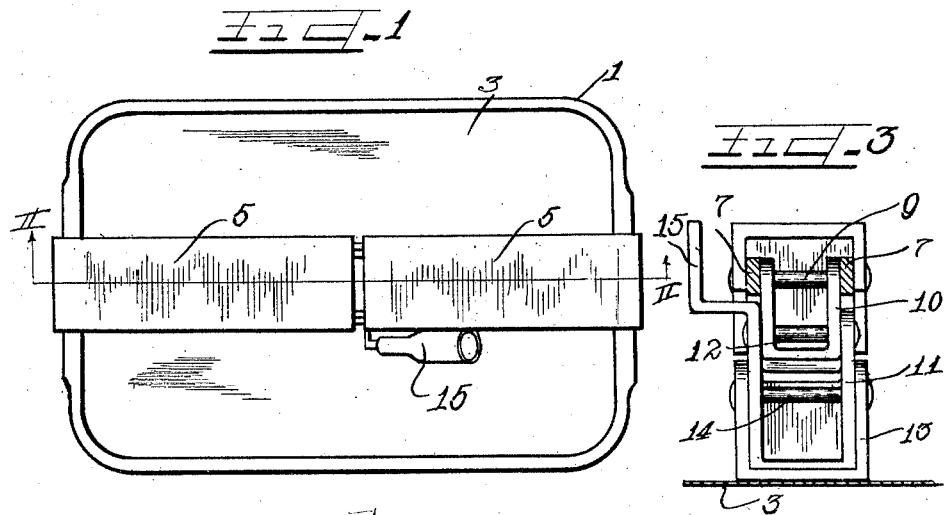
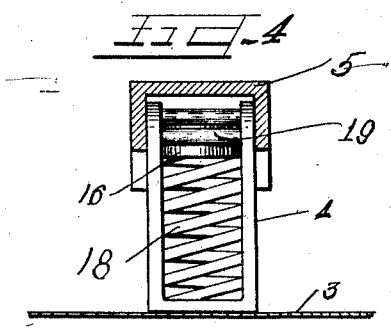
Inventor
Gustave Lidseen Patented July 9, 1929.

1,720,367

UNITED STATES PATENT OFFICE.

GUSTAVE LIDSEEN, OF CHICAGO, ILLINOIS.

MEAT PRESS.

Application filed June 1, 1926. Serial No. 112,751.

This invention relates to a meat pressing apparatus of that type in which hams or the like are compressed and boiled.

Such meat pressing apparatus generally comprises a boiler or receptacle in which the meat is placed, and a presser head which fits into the container over the meat and a member having a yielding engagement with the presser head anchored to the receptacle.

It is an object of this invention to provide novel means for compressing the springs between the presser head and member before the same is applied to the receptacle and for readily relieving the pressure of the springs when the same has been applied to the receptacle.

The invention comprises the novel structure and combinations hereinafter described and more particularly pointed out in the appended claims.

In the accompanying drawings which illustrate a preferred embodiment of this invention and in which similar reference numerals refer to similar features in the different views.

Figure 1 is a top plan view of a meat pressing apparatus involving this invention.

Figure 2 is an enlarged sectional view taken substantially upon the line II—II of Figure 1.

Figure 3 is an enlarged sectional view taken substantially upon the line III—III of Figure 2.

Figure 4 is an enlarged sectional view taken substantially upon the line IV—IV of Figure 2.

As shown on the drawings:

For the purpose of illustrating this invention, there is shown a meat holding receptacle 1 which is adapted to serve as a boiler. It is shown as of substantially rectangular form with anchoring flanges 2 upon its ends. A presser head 3 is designed for entering the container for compressing the meat. This presser head is connected to means suitably anchored to the flanges 2 as is well known in the art.

This invention concerns itself primarily with connections between the presser head and the anchoring means, as will now be more fully explained. A pair of U-shaped standards 4, as shown in Figure 4, are fixed to the top of the head 3 in suitable spaced relation and extend thereabove. A channel strip 5 is pivoted intermediate its ends to each standard 4 by the bolt 19. The outer end of each channel strip 5 carries a pivoted pawl 6 adapted for interlocking engagement with the flanges 2. A U-shaped joint piece 7 is firmly secured to one channel member by a pair of bolts 8 or the like, and is pivotally connected to the other channel member by a pivot bolt 9 whereby the two members are pivoted or hinged together for relative pivotal movement with respect to each other. A U-shaped device 10 is pivotally suspended from the bolt 9 and extends between the arms of a second U-shaped device 11 to which it is pivotally connected by a bolt 12. The U-shaped device 11 is pivoted to a U-shaped support 13 which is fastened at its base to the top of the presser head 3; the connection between the members 11 and 13 being effected by a bolt 14. Referring to Figure 3 it will be noted that the U-shaped device 11 is provided with an offset handle 15 which extends to one side in order that the same may be readily grasped by an operator for manual manipulation for operating the members 10 and 11 in the manner of a toggle, as shown in Figure 2.

Each channel member 5 carries a cylindrical cap 16 secured interiorly thereof. Each cap piece is located outwardly of the standard 4, and directly below the cap pieces 16 the presser head is provided with spring retaining lugs 17 and suitable coil springs 18 are confined between the caps 16 and the presser head.

While the operation of this apparatus appears obvious from the foregoing disclosure, a brief description thereof, however, will be given. The presser head 3 and the parts connected thereto may be termed a superstructure. Before this superstructure is applied to the receptacle 1, handle 15 is operated to swing the toggle members 10 and 11 into alignment, the engagement of the bases of the U-shaped members 11 and 13 due to the pivot 14 being to the right of the center line of member 11 prevents the toggle from breaking to the left (Fig. 2). This operation will elevate the jointed ends of the members 5 and depress the portions beyond the pivots 19 whereby the springs 18 are compressed. The superstructure may then be applied to the receptacle and the pawls 6 engaged with the flanges 2. If desirable the toggle formed by the members 10 and 11 may then be broken, as shown in Figure 2, to provide a more resilient pressure upon the meat. It is also possible to release the pawls 6 when it is desired to remove the superstructure.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a meat pressing apparatus a superstructure comprising a presser head, a pair of pivotally connected members pivotally sustained on said presser head, yielding means between said head and members, and toggle mechanism for actuating said members for the purpose set forth.

2. In a meat pressing apparatus, a container, a superstructure for said container comprising a presser head adapted to be inserted in the container, a pair of spaced standards rising from said presser head, a member pivoted to each standard, means for pivotally connecting said members for relative pivotal movement, a spring between the presser head and each member and located outwardly of the adjacent standard, and toggle mechanism connecting said presser head and the jointed ends of said members.

3. In a meat pressing apparatus, a superstructure comprising a presser head, a jointed anchoring member connected to said presser head, resilient means between said presser head and anchoring member, and means for actuating said anchoring member relative to said presser head, said anchoring member being adapted to flex upwardly and downwardly at the joint.

4. In a meat pressing apparatus comprising a container, a superstructure therefor comprising a presser head adapted for fitting in said container, a pair of members fulcrumed upon said presser head and having means for engaging the lateral ends thereof, a pivotal connection between said members, yielding means between said presser head and members and an operable toggle connection between said presser head and the pivotally connected members for the purpose set forth.

5. In a meat pressing apparatus comprising a container, a presser head adapted for fitting in said container, a pair of spaced standards rising from said presser head, an anchoring device pivoted to each standard and having means engaging the ends of said container, a pivotal connection between the adjacent ends of said anchoring devices, a toggle connection between said pivotally connected devices and the presser head, one of said members embodying an offset handle, and a spring between each device and the presser head.

6. In a meat pressing apparatus a superstructure comprising a presser head, a two part relatively swingable anchoring device sustained on said presser head, yielding means between said presser head and anchoring device, and an operative connection between said presser head and anchoring device for moving the former in a vertical direction relative to the latter.

In testimony whereof I have hereunto subscribed my name.

GUSTAVE LIDSEEN.